(12) United States Patent
Scott (10) Patent No.: US 11,146,301 B2
(45) Date of Patent: Oct. 12, 2021

(54) SYSTEMS AND METHODS FOR A CELLULAR PHONE ENCLOSURE

(71) Applicant: William James Scott, Mesa, AZ (US)

(72) Inventor: William James Scott, Mesa, AZ (US)

( * ) Notice: Subject to any disclaimer, the term of this patent is extended or adjusted under 35 U.S.C. 154(b) by 21 days.

(21) Appl. No.: 16/408,388

(22) Filed: May 9, 2019

(65) Prior Publication Data

US 2020/0358468 A1 Nov. 12, 2020

(51) Int. Cl.
*H04M 1/02* (2006.01)
*H04B 1/3827* (2015.01)
*A45C 11/00* (2006.01)

(52) U.S. Cl.
CPC ............ *H04B 1/3838* (2013.01); *A45C 11/00* (2013.01); *A45C 2011/002* (2013.01)

(58) Field of Classification Search
CPC .... H04M 1/0206; G06F 1/1652; G06F 1/181; G06F 1/1626; G06F 1/1615; G06F 1/1677
See application file for complete search history.

(56) References Cited

U.S. PATENT DOCUMENTS

| | | | |
|---|---|---|---|
| 9,241,051 B1 * | 1/2016 | Peterson, III | H04M 1/0264 |
| 9,525,763 B1 * | 12/2016 | Lee | H04M 1/0249 |
| 2005/0017910 A1 * | 1/2005 | Park | H01Q 1/243 |
| | | | 343/702 |
| 2005/0064829 A1 * | 3/2005 | Kang | H04W 52/028 |
| | | | 455/127.1 |
| 2006/0274506 A1 * | 12/2006 | Huang | H04B 1/036 |
| | | | 361/704 |
| 2007/0031693 A1 * | 2/2007 | Suzuki | B27M 1/02 |
| | | | 428/537.1 |
| 2007/0031696 A1 | 2/2007 | Caspers | |
| 2009/0137275 A1 | 5/2009 | Amirmokri | |
| 2010/0089527 A1 * | 4/2010 | Lee | B27D 1/083 |
| | | | 156/245 |
| 2010/0240421 A1 | 9/2010 | Sekora | |
| 2014/0077669 A1 | 3/2014 | Choi | |
| 2014/0163774 A1 * | 6/2014 | Demeniuk | G08C 17/02 |
| | | | 701/2 |
| 2015/0014319 A1 * | 1/2015 | Norris | G06F 1/1626 |
| | | | 220/324 |
| 2015/0229754 A1 * | 8/2015 | Won | G06F 1/165 |
| | | | 455/575.8 |
| 2017/0013925 A1 * | 1/2017 | Fathollahi | A45C 13/02 |
| 2017/0196331 A1 | 7/2017 | Gluck | |
| 2017/0289699 A1 * | 10/2017 | Srivastava | H04R 17/00 |
| 2018/0152550 A1 * | 5/2018 | Dharmatilleke | H04M 1/0266 |

(Continued)

*Primary Examiner* — Rafael Pérez-Gutiérrez
*Assistant Examiner* — Xiang Zhang
(74) *Attorney, Agent, or Firm* — Lynch LLP (57) ABSTRACT

Disclosed herein is an improved electronic device enclosure and methods for manufacturing the same. One embodiment includes a front panel; a back panel with a patterned intrusion region to improve passive audio amplification; an electrically conductive front plate; an electrically conductive back plate with an open region configured to permit transmission of radiofrequency signals; wherein the front plate couples with the front panel, the back plate couples with the back panel, the front panel hingedly couples with the back panel, and the front plate and back plate are configured to enclose an electronic device; and the front plate is sized and dimensioned to block radiofrequency radiation from exiting the front panel of the electronic device enclosure.

14 Claims, 6 Drawing Sheets

(56) References Cited

U.S. PATENT DOCUMENTS

2018/0278730 A1* 9/2018 Saeed ................ G06Q 20/322
2019/0036564 A1* 1/2019 Tanenbaum ......... H04B 1/3838
2019/0067795 A1* 2/2019 Shin .................... H01Q 9/0414

* cited by examiner

SYSTEMS AND METHODS FOR A CELLULAR PHONE ENCLOSURE

FIELD OF THE INVENTION

The field of the invention is cellular telephone enclosures.

BACKGROUND

The background description includes information that may be useful in understanding the present invention. It is not an admission that any of the information provided in this application is prior art or relevant to the presently claimed invention, or that any publication specifically or implicitly referenced is prior art.

Cell phones emit radiation, which, at some levels in some frequencies, can have a harmful effect on the human body. Repeated exposure over a long period of time may cause cancer or other harmful health effects, particularly when the radiation is ionizing. Current research on the long-term effect of non-ionizing near-field radiation at some frequencies, particularly those in cell phones, has not been conclusive. This is in part because many longitudinal studies simply would not have had time to study the effects of fifty years of exposure of a variety of different antenna designs in cellular phones, particularly newer designs of phones.

While Federal Communications Commission testing of cell phone radiation permits a distance of 5 mm between the cell phone and the body, many users hold their phones closer to their ears while making a receiving phone calls. As a result, radiation absorbed by the human body may be higher than safety regulations anticipate. The National Cancer Institute says that findings from different studies of cell phone use and cancer risk are inconsistent, and a few studies have shown some evidence of statistical association of cell phone use and brain tumor risks in humans (though most studies show no association). In sum, the effects on the human body of radiation from cell phones are not completely understood. Nevertheless, users may benefit from a device that reduces their exposure to radiation from cell phones.

Some devices designed to block or absorb cell phone signals from the human body can result in weakening the signal from nearby cell towers that ultimately reach the cell phone. Software in the phone, detecting a weaker signal, then instructs the phone to increase antenna power to compensate, counterintuitively resulting in a greater amount of radiation reaching the human body and higher battery drain. The FTC warns that products that block only the earpiece or another small portion of the phone are "totally ineffective" because the entire phone emits electromagnetic waves. The FTC further warns that devices that interfere with a phone's signal to the tower can cause emission of more radiation, drawing more power in the process.

Radiative patterns emitted by cell phones vary depending on the model of phone. Thus, a device designed to effectively redirect radiation away from the user designed for one model of phone may not be effective for another model of phone.

Other risks of modern cell phones may include distracted driving, shorter attention spans, and other cognitive impairments.

US Publication No. 2010/0240421 teaches a phone case designed to block cellular phone radiation from reaching the user's body. But it fails to teach a phone case that blocks harmful radiation while also providing other desirable qualities in a phone case, such as passive sound amplification. Further, the publication fails to teach a phone case that enables a user to enable a complete Faraday cage around a phone to block effectively all radio signals from leaving or entering the phone case. Finally, the publication fails to teach or disclose a cell phone case optimized for the radiative patterns of modern cell phones. The design of the shielding described in the publication is also designed to enable operation of the touchscreen without reconfiguration by the user, but the result is inferior shielding of radiation and failure to impede addictive screen-time behaviors by users.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that a design is possible that enables superior redirection of cell phone radiation, amplified speaker audio, and inhibited access to the cell phone screen to reduce screen addiction.

SUMMARY OF THE INVENTION

The present invention provides apparatuses, systems, and methods in which a cell phone case prevents harmful radiation from reaching the user and provides superior audio quality, while reducing harmful screen addiction.

In one aspect of the inventive subject matter, an embodiment comprises a slotted front plate comprising a front slot, the front plate coupled to a copper shield, which comprises audio-amplification openings. The front plate is hingedly coupled to a back plate, the back plate comprises a slot opening for a camera and a flash mechanism. In one embodiment, the front plate and back plate are made of a dense wood material, such as teak, which insulates the user from heat generated by the cell phone and provides other desirable effects. The back plate further includes a lip configured to receive a cell phone, a slot through which buttons on the side of a phone may be pressed through the lip, and additional slots through which cables may be coupled with the phone through the lip of the front plate. The front plate also includes a lip with audio amplification patterns matching the audio-amplification openings on the copper shield. Together, this provides a housing that achieves superior audio amplification while also redirecting radiation away from the user's body. The back plate also includes octagonal notched patterns to increase the ability of the case to passively amplify sound. Optimally, the copper shield is configured to be concave relative to the phone to redirect cell signals away from the user and towards a cell tower, reducing the amount of energy required to be output by the antenna.

In another aspect of the inventive subject matter, the front plate, copper shield, and back plate, are configured to provide a closeable antenna opening to enable a user to shield all radio signals to and from the cell phone, thereby increasing user privacy.

One should appreciate that the disclosed subject matter provides many advantageous technical effects including reduced absorption of radiation by a user while also providing increased audio amplification. This configuration also facilitates additional user privacy by enabling a user to eliminate the ability of cell phone towers to "ping" a cell phone and blocking the ability of malicious actors from enabling a cell phone's microphone for eavesdropping purposes.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Figure 1A:
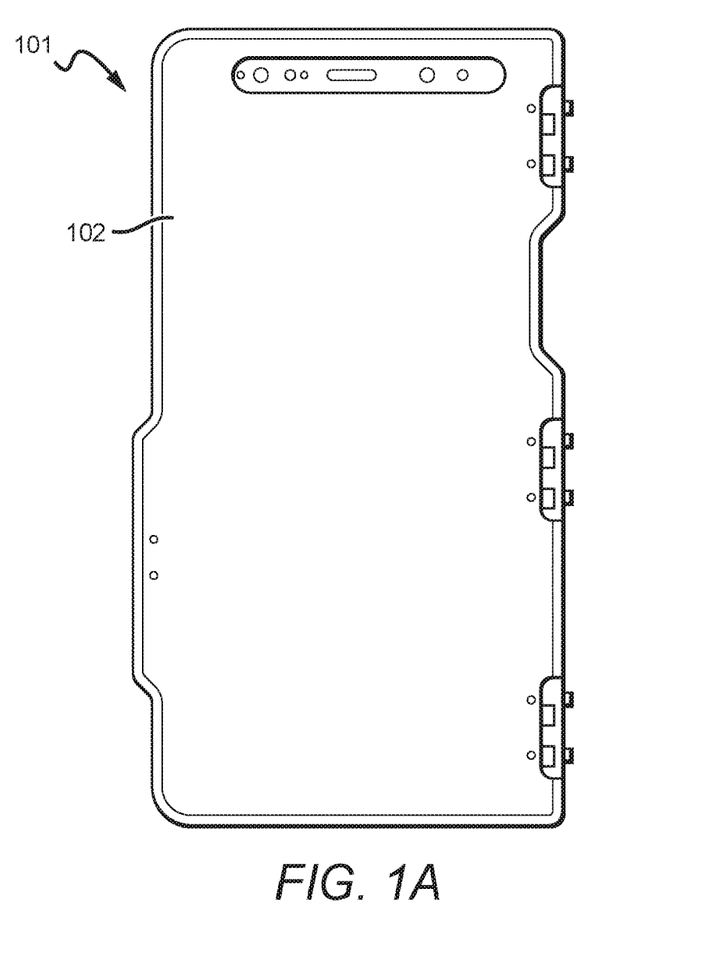
FIG. 1A depicts an embodiment of the invention in an enclosed configuration from the front.

In FIG. 1A, an embodiment of the invention is depicted in a closed configuration from the front. Phone cover 101 is preferably formed from a hard material such as wood (e.g., teak) which, when configured according to the invention, has acoustically amplifying properties, or plastic. The front panel 102 is formed from a continuous piece of the hard material in a shape that roughly conforms to the shape of a cell phone to be enclosed in phone cover 101. On the left side of phone case 101 is a protrusion formed in the solid body of front panel 102, which is configured to hold a coupling mechanism for mating with a corollary coupling mechanism on a back panel, as described below. Front panel 102 also includes a slotted area permitting access to a front-facing camera and microphone on an enclosed cell phone. The figures depict an embodiment of the invention to scale; however, other configurations are possible at different scales, positions, and configurations without departing from the spirit of the invention, as will be apparent to one of skill in the art.

Figure 1B:
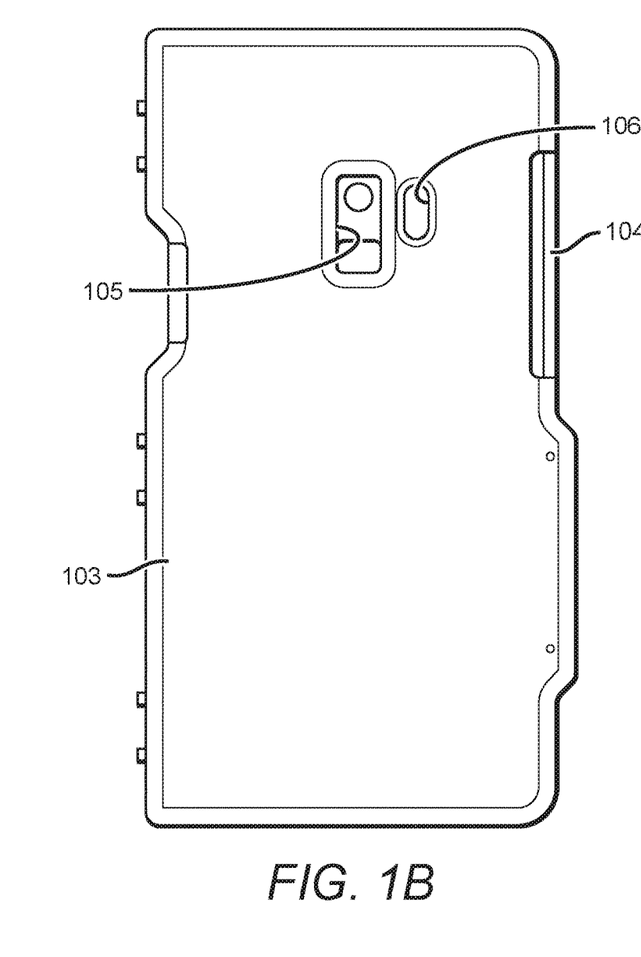
FIG. 1B depicts an embodiment of the invention in an enclosed configuration from the back.

FIG. 1B depicts the embodiment described from the back, in a closed configuration. Back panel 103 is preferably formed from the same hard body material as front panel 102, such as teak, for both aesthetic and functional purposes of the device and to facilitate manufacture, as will be described. Back panel 103 also includes a first slot 105 for a camera on an enclosed cell phone to receive light from outside back panel 103. Back panel 103 further includes a second slot 106 to permit a back-facing light-emitting diode (e.g., a camera flash or flashlight) or other light emitter to illuminate an area outside back panel 103. Back panel 103 further includes a slotted area 104 on the perimeter to facilitate access to buttons or other human-computer interaction components that may be located on the periphery of an enclosed cell phone. Finally, back panel 103 also includes a protrusion, described in further detail below by reference to FIG. 2, for holding a coupling mechanism configured to mate with a corollary coupling mechanism on front panel 102.

Figure 1C:
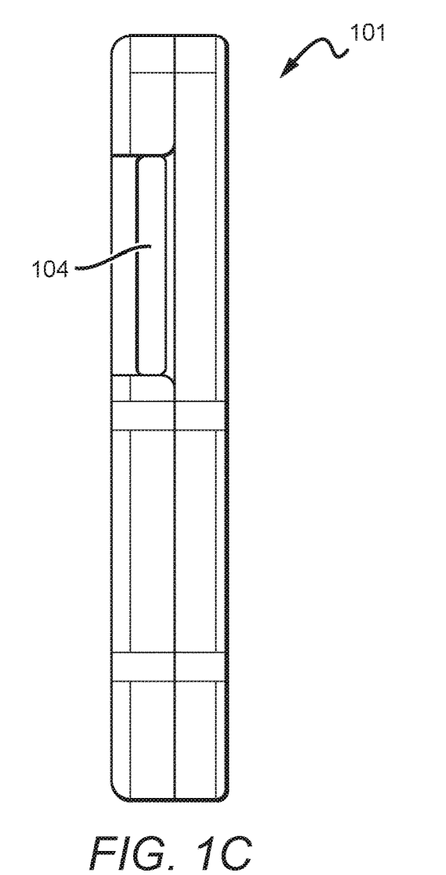
FIG. 1C depicts an embodiment of the invention in an enclosed configuration from the left side.

FIG. 1C depicts the embodiment of the invention as described from the left side, providing a side view including slotted area 104, which provides user access to buttons or other human-computer interaction components on the periphery of an enclosed cell phone. Optionally, an interface material, such as a polypropylene insert, may provide an interface between the enclosed cell phone and a user's fingers. This interface can make the buttons on the phone easier to press when the phone is enclosed in the phone cover 101, and the provision of an insert can also include an additional copper shield to block radiation that would otherwise pass through this part of the phone case to better shield the user from radiation from the phone's antenna.

Figure 1D:
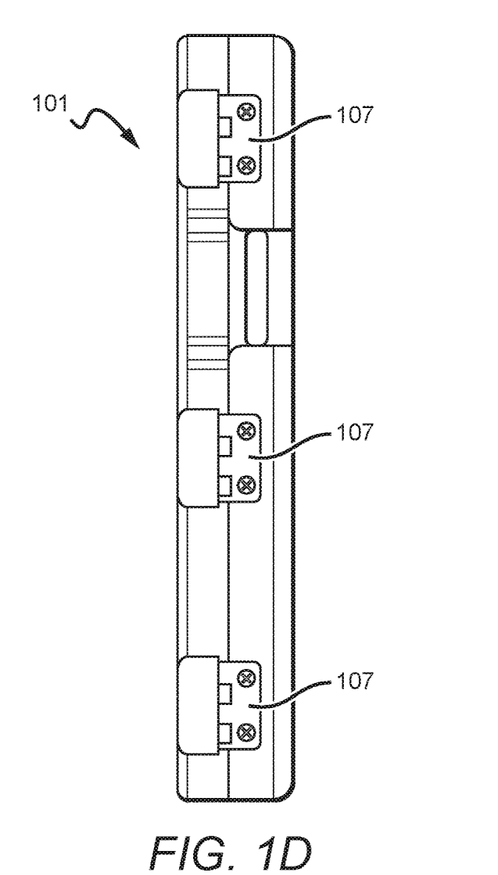
FIG. 1D depicts an embodiment of the invention in an enclosed configuration from the right side.

FIG. 1D depicts the embodiment of the invention from the right side and depicts hinged coupling mechanism 107, comprising three hinges spaced apart, each fastened by two 4 mm screws. Preferably, the hinged coupling mechanism is formed from copper or bronze to improve radiation shielding and provide desirable aesthetic qualities.

Figure 1E:
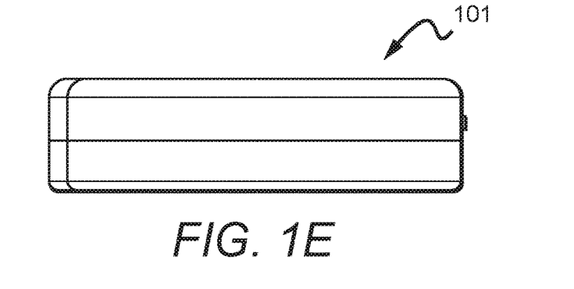
FIG. 1E depicts an embodiment of the invention in an enclosed configuration from the bottom.

FIG. 1E depicts the embodiment of the invention from the top.

Figure 1F:
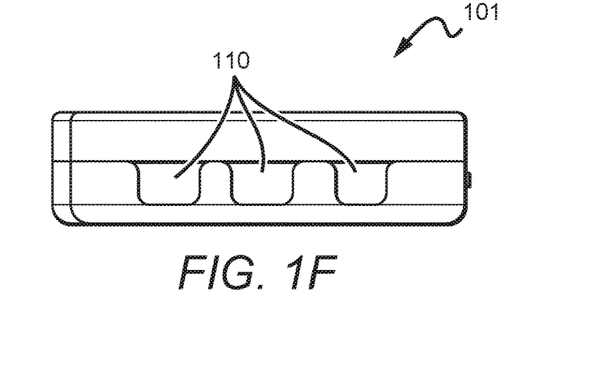
FIG. 1F depicts an embodiment of the invention in an enclosed configuration from the top side.

FIG. 1F depicts the embodiment of the invention from the bottom, including slotted areas 110, which permit access to areas of the enclosed cell phone configured to receive a cable, such as a charging cable, video cable, headphone cable, or other analog or digital data physical coupling mechanism, through the slotted areas 110.

Figure 2:
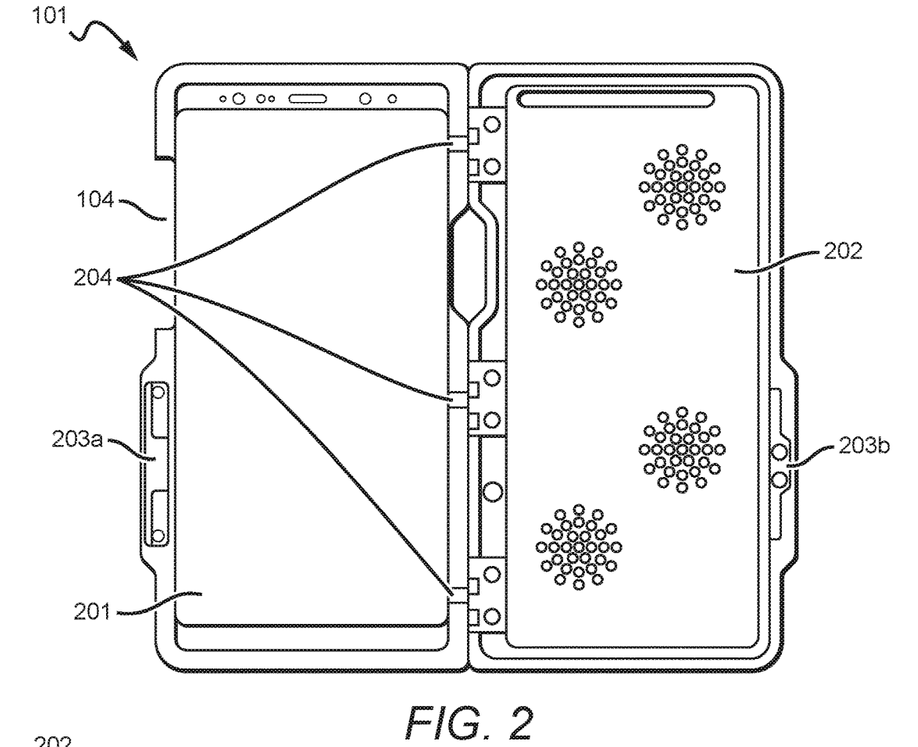
FIG. 2 depicts an embodiment of the invention in an open configuration from the front.

FIG. 2 depicts the embodiment of the invention in an open configuration from the front. As seen in the FIG. 2, cell phone 201 is received by the back panel, which includes slotted area 104 described above. FIG. 2 further depicts coupling mechanism 203a, which is configured to mate with coupling mechanism 203b to hold the case in a "closed" configuration until pulled apart by the user. Front plate 202 is preferably formed exclusively from a single material, such as copper or another electrically conductive material, and is intended to provide radiofrequency shielding between cell phone 201 and a user's body. In some embodiments, front plate 202 can be formed from a combination of radiation shielding materials as well as other materials (e.g., plastic, wood, etc.) such that the radiation shielding materials are strategically configured and positioned with the front plate to shield a user from radiation while also reducing cost by incorporating cheaper materials. Also included are protruded coupling mechanisms 204, which are formed contiguously with a back plate and configured to couple to the body of phone case 101. Front plate 202 will be described in greater detail below.

Figure 3:
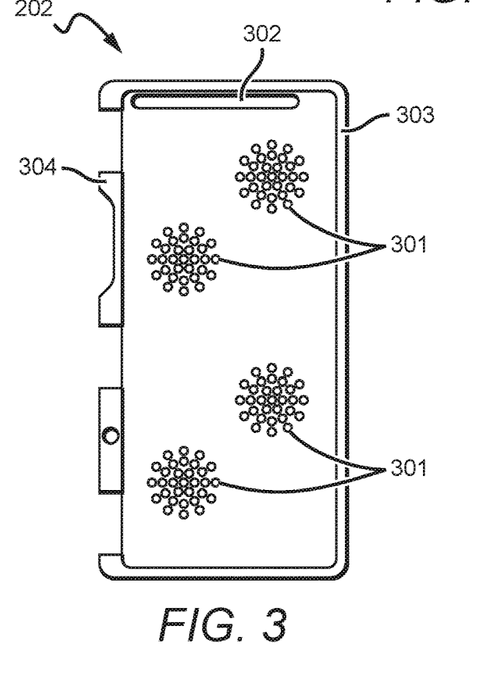
FIG. 3 depicts the copper shielding of the inventive subject matter.

FIG. 3 depicts front plate 202, which comprises a lip region 304 that is in roughly a parallel plane to the main body of the front plate 202, but it is raised from the main body and extrudes outward to form a coupling area with the front panel 102. Optionally, a hole for a screw is provided on the lip region 304 to receive a screw for a hinge that is optionally part of the hinged coupling mechanism 107. In such an embodiment, the hole on lip region 304 facilitates affixing the front panel 102, back panel 103, and front plate 202 to one another. Front plate 202 additionally includes audio amplifying portion 301 that allows sound to travel within the chamber of an enclosed phone cover 101. Front plate 202 also includes slotted area 302, which provides a means for users to interact with front-facing interface mechanisms, such as a cell phone's front-facing camera, light-emitting diode, and microphone.

Figure 4:
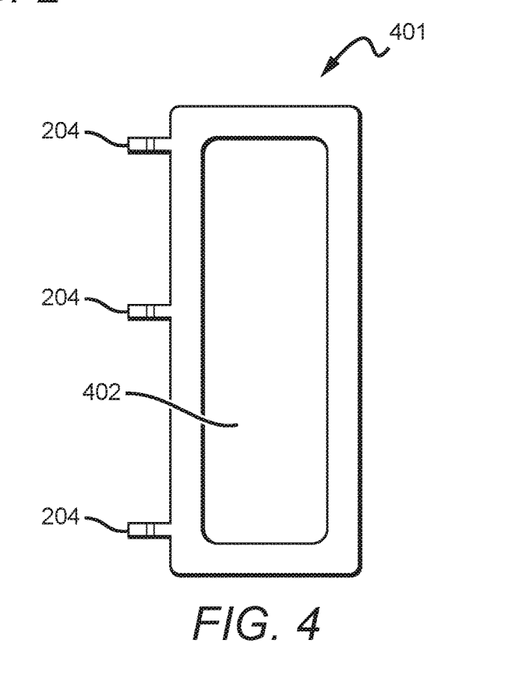
FIG. 4 depicts a back copper shielding of the inventive subject matter.

FIG. 4 depicts a back plate 401, which is preferably formed exclusively from a single material, such as copper. Further, for manufacturing purposes described below, back plate 401 is preferably formed from the same material or materials and according to the same manufacturing priorities (e.g., radiation blocking and cost reduction) as front plate 202. Back plate 401 includes coupling mechanisms 204, which are extrusions from the main body of back plate 401 and provide a region to couple back plate 401 with the back panel 103 near the points of the hinged coupling mechanism 107. Back plate 401 additionally includes hollow area 402, which provides a path for radiofrequency signals to exit the phone cover 101 facing away from the user's body, and preferably toward a cell tower. Hollow area 402 is preferably shaped to maximize the strength of signals sent and received by the antenna in enclosed cell phone 201.

Figure 5:
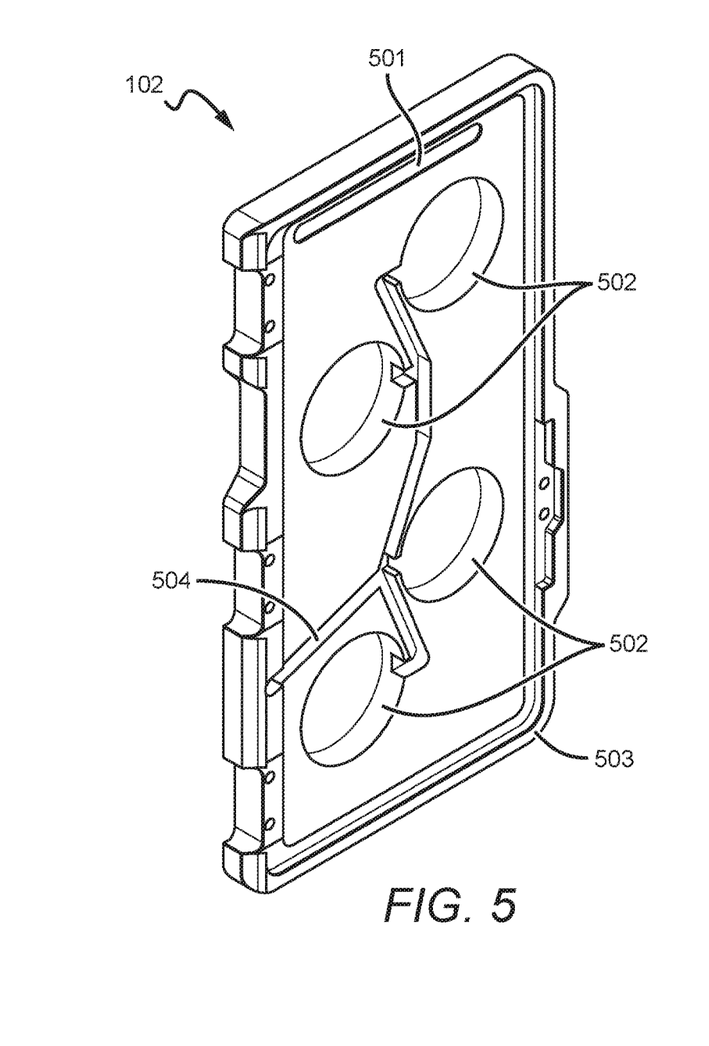
FIG. 5 depicts an angled view of the front cover of the inventive subject matter.

FIG. 5 depicts an interior view of front panel 102. Front panel 102 includes slotted area 501, which is configured to align with slotted area 302 on the front plate to permit an interface between enclosed cell phone 201 and the exterior of phone cover 101. Front panel 102 additionally includes hollow regions 502, which are configured to align with audio amplifying portion 301 on front plate 202 when assembled. The hollow regions 502 enhance the ability of the phone cover 101 to passively amplify sound, which effectively enables a user to hold a mobile device further away from the user's body, reducing radiation to the user's body. Front panel 102 additionally includes a protruded lip region 503, which is sized and dimensioned to mate with back panel 103 and provide a hollow space in which to enclose cell phone 201 and front plate 202.

Figure 6:
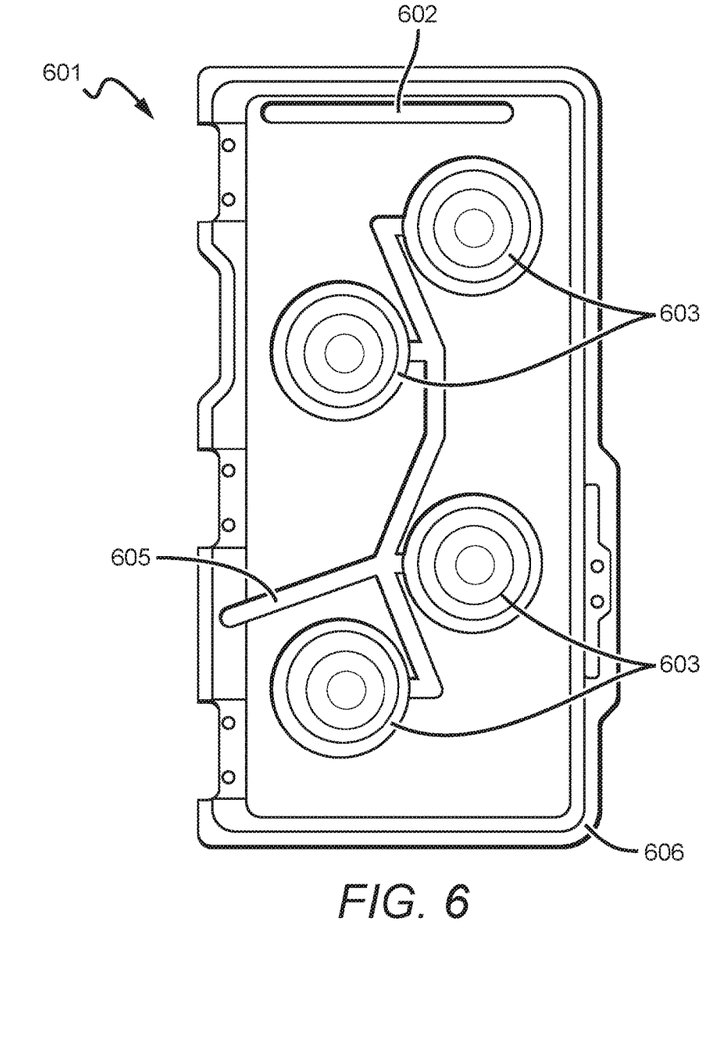
FIG. 6 depicts a front view of the front cover of the inventive subject matter.

Hollow regions 502 are also capable of housing electronics capable of active sound amplification, as shown in FIG. 6. Each region may contain a speaker, and one region may also comprise a battery. The slotted area 504 between hollow regions 502 is capable of housing electronic cables for connecting active sound amplification to power the speakers. As shown in FIG. 6, speakers 603 may be housed in hollow regions, electrically coupled by wiring through channel 605. Front panel 601 further includes a protruded lip region 606. Front panel 601 is thus interchangeable with front panel 102. One or more hollow regions may comprise a battery, which may be rechargeable, or both speakers and a battery.

Figure 7:
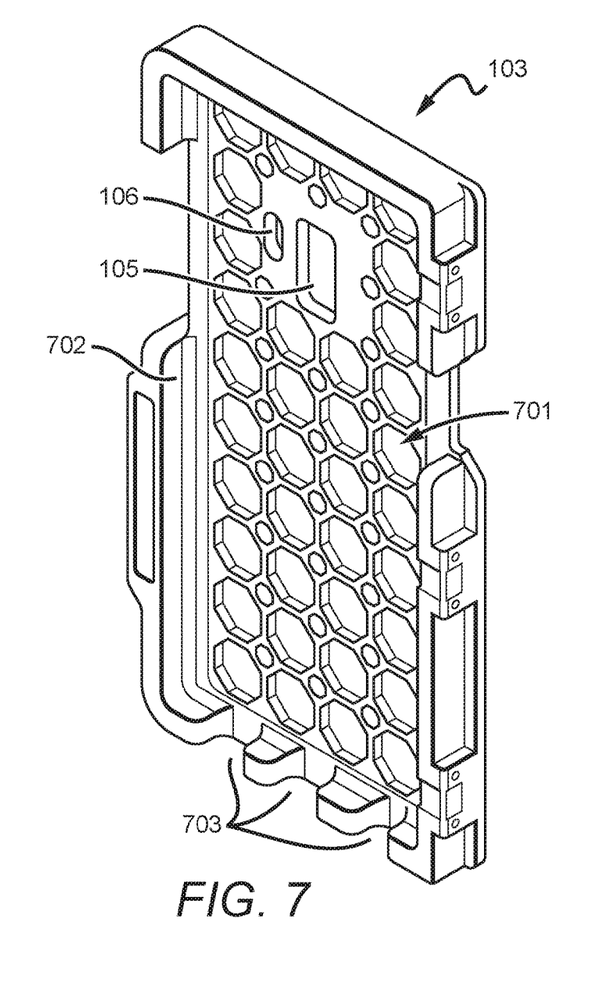
FIG. 7 depicts an angled view of the back cover of the inventive subject matter.

FIG. 7 depicts an interior view of back panel 103. As described, back panel 103 comprises first slot 105 and second slot 106, which are sized and dimensioned to provide access to an area outside phone cover 101 by cell phone 201. Additionally included is patterned area 701, comprising indented octagons for improved passive audio amplification. Back panel 103 also includes a lip region 702, sized and dimensioned to mate with front panel 102 and provide a hollow space (the chamber) in which to enclose cell phone 201 and back plate 401. Back panel 103 also includes periphery gap regions 703, which are sized and dimensioned to provide access to an enclosed cell phone's interface ports (e.g., USB ports of any standard, audio ports, proprietary ports, etc.).

Figure 8:
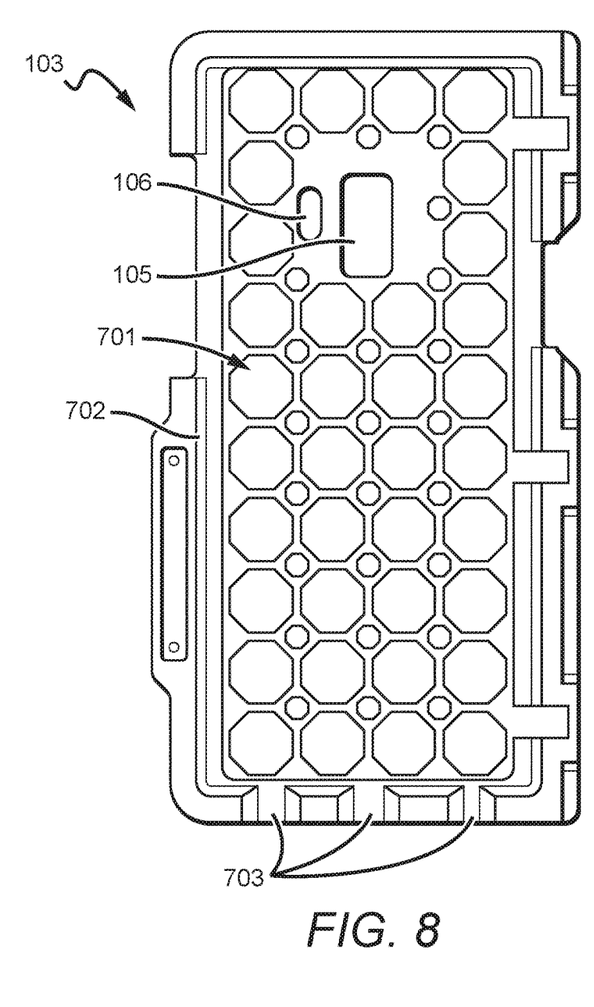
FIG. 8 depicts a front view of the back cover of the inventive subject matter.

FIG. 8 depicts an additional interior view of back panel 103.

In one embodiment of the invention, front panel 102 is approximately 3.35 inches wide, and all drawings are to scale. In this embodiment, an octagonal patterned area comprises indented octagons spaced four across and ten down on back panel 103. The octagonal patterned area can be omitted in some embodiments, and it can have any number of rows and columns of octagonal elements. Moreover, it is contemplated that any other shape can be used in place of octagons, so long as the effect of including the features is to passively amplify sound. In another embodiment of the invention, front panel 102 is instead sized and dimensioned to contain an iPhone XR, and drawings are not to scale. In another embodiment of the invention, a switch provided to the user is enabled to close a Faraday cage around cell phone 201, accomplished either by an additional plate to close slotted area 402 through physical manipulation or by a material placed over hollow area 402 whose electrically conductive properties change as a function of stress or voltage (e.g., a piezoelectric material), and whose stress or voltage is determined by the position of a switch.

Figure 9:
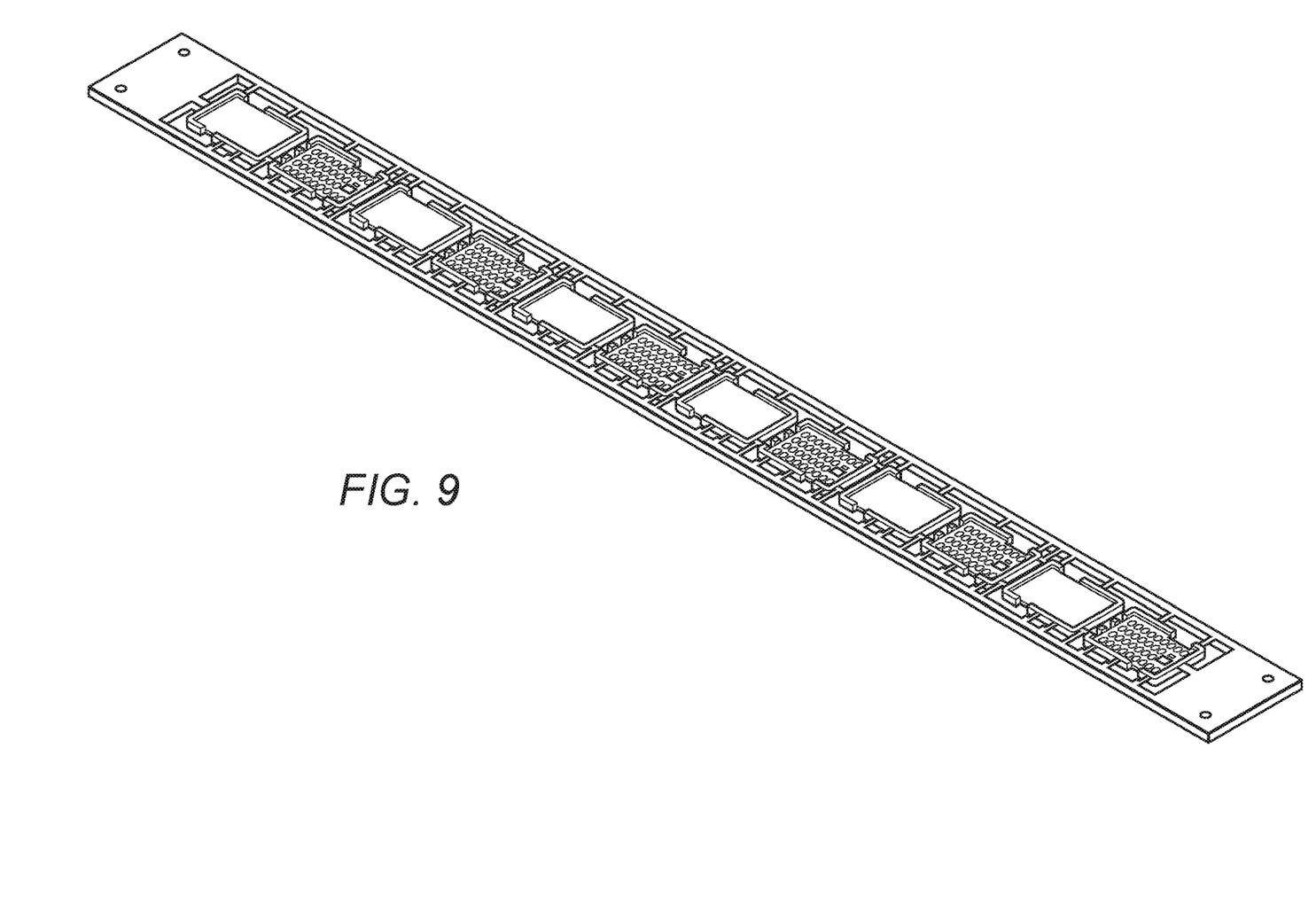
FIG. 9 depicts a plank for use in manufacturing an electronic device enclosure.

A method of manufacturing the phone cover 101 is disclosed in the following paragraphs. A plank according to the manufacturing process described below is depicted in FIG. 9. In one step, a wood or plastic plank is set atop a router table. The front side of a plurality of front panels and back panels (as described above) is machined into the front side of the plank, leaving a plurality of template connections 901 to the plank on each front panel and back panel for ease of manufacturing the back side. The plank is then flipped atop the router table, and the back side of the plurality of front panels and back panels are machined into the back side of the plank. Mounting holes are drilled into the plank for use in the manufacturing process, e.g. to mount the plank in the same reference location for an automated milling machine (such as a CNC machine).

When the plurality of front and back panels have been machined into the plank, each of the front and back panels is then separated from the plank by severing the plurality of template connections 901. Threaded inserts are then installed into areas on the front panel and back panel necessary to attach hinged coupling mechanisms to the front panel and back panel.

Thus, specific compositions and methods of an improved phone cover and methods of manufacturing an improved phone cover, which directs radiation away from a user's body and toward a cell tower have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. An electronic device enclosure, comprising:
   a front panel comprising a hollow audio amplification intrusion, a first slotted area configured to provide access to an enclosed electronic device's front-facing camera, a front panel hinge portion disposed on a first lip region that is disposed on a first front panel edge, and a first protrusion on a second front panel edge opposite the first front panel edge, the first protrusion comprising a first coupling mechanism;
   wherein the first lip region extrudes outward from the first front panel edge to form a surface parallel to the front panel;
   wherein a first coupling mechanism is disposed on the surface of the first lip region;
   wherein the front panel comprises a first material;
   a back panel comprising a second slotted area configured to provide access to an enclosed electronic device's rear-facing camera;
   the back panel further comprising a back hinge portion disposed on a second lip region disposed on a first back panel edge and a second protrusion on a second back panel edge opposite the first back panel edge, the second protrusion comprising a second coupling mechanism;
   the back panel further comprising a patterned intrusion region to improve passive audio amplification;
   wherein the second lip region extrudes outward from the second back panel edge to form a surface parallel to the back panel;
   wherein the back panel comprises the first material;
   a front plate comprising an audio amplification hole region configured to align with the hollow audio amplification intrusion, a third lip region, a third slotted area configured to align with the first slotted area;
   wherein the front plate comprises a first electrically conductive material;
   a back plate comprising an open region configured to permit transmission of radiofrequency signals;
   wherein the back plate comprises a second electrically conductive material;
   wherein the front plate is coupled with the front panel, the back plate is coupled with the back panel, the front panel hinge portion couples with the back panel hinge portion, and the front plate and back plate are configured to at least partially enclose an electronic device;
   wherein the front plate is configured to block radiofrequency radiation from exiting the front panel of the electronic device enclosure;
   wherein the first coupling mechanism and the second coupling mechanism are positioned to facilitate coupling between the first coupling mechanism to the second coupling mechanism upon closing the electronic device enclosure.

2. The electronic device enclosure of claim 1, wherein the first electrically conductive material and the second electrically conductive material are the same.

3. The electronic device enclosure of claim 1, wherein the patterned intrusion region comprises a plurality of octagonal intrusions.

4. The electronic device enclosure of claim 3, wherein the plurality of octagonal intrusions is sized and dimensioned for four intrusions widthwise and ten intrusions lengthwise.

5. The electronic device enclosure of claim 1, wherein the front panel is approximately three and thirty-five hundredths of an inch in width.

6. The electronic device enclosure of claim 1, wherein the second electrically conductive material is copper.

7. The electronic device enclosure of claim 1, wherein the first material is teak.

8. An electronic device enclosure, comprising:
   a front panel formed at least partly from a first material, the front panel comprising an audio amplification intrusion, a first slotted area configured to provide access to an enclosed electronic device's front-facing camera, a first lip region, disposed along a first front panel edge, the first lip region comprising a front hinge portion, a first selective coupling mechanism disposed on a second front panel edge opposite the first front panel edge;
   a back panel formed at least partly from a second material, the back panel comprising a second lip region disposed along a first back panel edge, the second lip region comprising a back hinge portion, a second selective coupling mechanism disposed on a second back panel edge opposite the first front panel edge, and a patterned intrusion region configured to improve passive audio amplification;

an electrically conductive front plate comprising an audio amplification hole region configured to align with the audio amplification intrusion; and an electrically conductive back plate comprising an open region configured to permit transmission of radiofrequency signals;

wherein the front plate is configured to couple with the front panel, the back plate is configured to couple with the back panel, the front hinge portion couples with the back hinge portion, and the front plate and back plate are configured to at least partially enclose an electronic device;

wherein the front plate is configured to block radiofrequency radiation from exiting the front panel of the electronic device enclosure; and wherein the first selective coupling mechanism and the second selective coupling mechanism are positioned to facilitate coupling between the first coupling mechanism and the second coupling mechanism upon closing the electronic device enclosure.

9. The electronic device enclosure of claim 8, wherein the electrically conductive front plate is formed from copper.

10. The electronic device enclosure of claim 9, wherein the electrically conductive back plate is formed from copper.

11. The electronic device enclosure of claim 8, wherein the patterned intrusion region comprises a plurality of octagonal intrusions.

12. The electronic device enclosure of claim 11, wherein the plurality of octagonal intrusions is sized and dimensioned for four intrusions widthwise and ten intrusions lengthwise.

13. The electronic device enclosure of claim 12, wherein the first material is teak.

14. The electronic device enclosure of claim 8, wherein the audio amplification intrusion comprises four intrusions spaced apart, each of which houses a speaker.

* * * * *